United States Patent [19]

Ackermann

[11] 3,748,568
[45] July 24, 1973

[54] AUTOMATICALLY TERMINATING BATTERY CHARGING ARRANGEMENT WITH MEANS FOR DECREASING RIPPLE EFFECT

[75] Inventor: Karl Ackermann, Berlin, Germany

[73] Assignee: Robert Bosch Photokino GmbH, Stuggart, Germany

[22] Filed: Apr. 18, 1972

[21] Appl. No.: 245,097

[30] Foreign Application Priority Data
Apr. 28, 1971 Germany.................. P 21 20 798.7

[52] U.S. Cl................. 320/31, 320/39, 320/DIG. 2, 321/10
[51] Int. Cl. ............................................ H02j 7/10
[58] Field of Search.................. 320/39, 40, 30–32, 320/DIG. 2; 321/10, 18, 19

[56] References Cited
UNITED STATES PATENTS

| | | | |
|---|---|---|---|
| 3,123,759 | 3/1964 | Grey | 320/40 |
| 3,486,104 | 12/1969 | Epstein | 321/10 |
| 3,048,763 | 8/1962 | Cady | 320/39 |
| 3,497,791 | 2/1970 | Moore | 320/39 |

Primary Examiner—J. D. Miller
Assistant Examiner—Robert J. Hickey
Attorney—Michael S. Striker

[57] ABSTRACT

Charging of a battery from an A.C. source through a controlled rectifier is terminated when a voltage varying directly with the battery output voltage and inversely with A.C. ripple on the battery output voltage has reached a predetermined amplitude.

11 Claims, 1 Drawing Figure

PATENTED JUL 24 1973
3,748,568
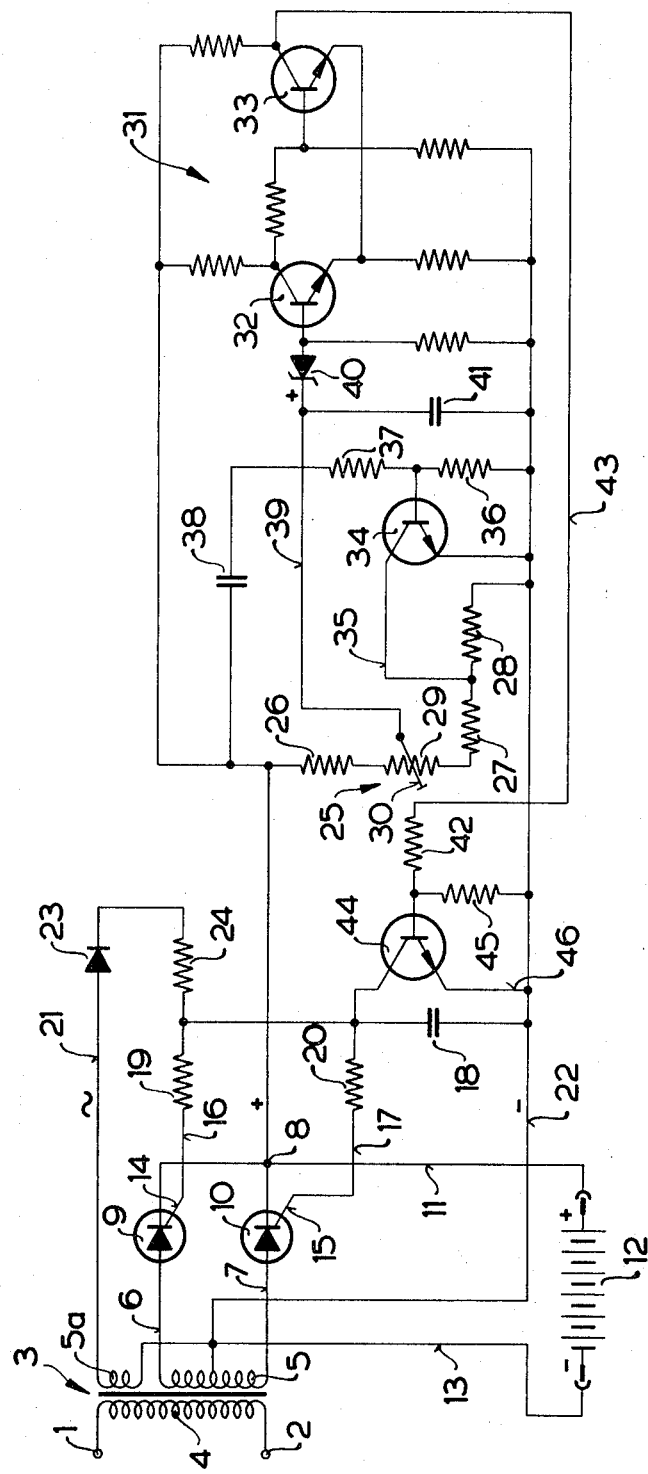

3,748,568

AUTOMATICALLY TERMINATING BATTERY CHARGING ARRANGEMENT WITH MEANS FOR DECREASING RIPPLE EFFECT

BACKGROUND OF THE INVENTION

The invention relates to recharging arrangements which are supplied from an A.C. voltage supply and wherein the battery is charged through controlled rectifier means which are blocked, thereby terminating the charging process, when the battery voltage has reached a predetermined desired charging voltage.

In arrangements of this type the voltage existing at the rectifier output terminal, to which the battery terminal is connected, has an A.C. component as well as a D.C. component. The size of this A.C. component, or ripple voltage, relative to the D.C. component varies in dependence upon the charging current which in turn varies at least in part in dependence upon the actual A.C. voltage furnished by the voltage supply. The latter is of course subject to relatively large variations. In conventional equipments the circuit which terminates the charging process should of course respond only to the actual desired battery voltage. Instead it responds to the D.C. voltage with its superimposed ripple voltage. Since the effect of the ripple voltage is a variable effect which cannot be predicted, the conventional circuits often terminate the charging process in response to excess ripple voltage, rather than in response to the desired battery voltage. Thus the charging process may be terminated before the battery is anywhere near its fully charged state.

SUMMARY OF THE INVENTION

It is the object of the present invention to furnish a battery charging arrangement wherein the above-mentioned effect of the ripple voltage is substantially decreased, thereby causing the charging process to be terminated only when the battery has been charged to the desired voltage.

The present invention comprises a battery charging arrangement having rectifier means furnishing a rectifier output voltage having a D.C. and an A.C. component at a rectifier output terminal. Connecting means connect said rectifier output terminal to said battery. The present invention further comprises first circuit means connected to said rectifier output terminal for furnishing a first voltage corresponding to said rectifier output voltage. It further comprises second circuit means connected to said rectifier output terminal for furnishing a second voltage varying only in dependence upon said A.C. component of said rectifier output voltage. Third circuit means are connected to said first and said second circuit means and furnish a combined voltage varying as a function of both said first and second voltage. Finally, terminating means terminate the charging of the battery when said combined voltage is equal to a predetermined voltage, said predetermined voltage being indicative of a fully charged battery.

In a preferred embodiment of the present invention the first circuit means comprise first voltage divider means furnish the first voltage at a first voltage divider terminal. Similarly, the second circuit means comprise second voltage divider means, but D.C. blocking means are connected in series with said second voltage divider means, whereby the second voltage, furnished at the second voltage divider terminal, is a function only of the A.C. component of said rectifier output voltage.

The third circuit means may then be a transistor whose emitter-collector circuit is connected in parallel with a predetermined portion of said first voltage divider means and whose base is connected to said second voltage divider means, the resistance of said collector-emitter circuit varying as a function of the voltage at said base. The voltage at said first voltage divider terminal then is a combined voltage which varies as a function both of the complete rectifier output voltage and also in dependence upon the A.C. component of that voltage.

The terminating means may be an electronic switching circuit such as a Schmitt trigger which furnishes a switching output signal when the combined voltage exceeds a predetermined voltage. In order to control this point exactly, a Zener diode may be connected between the input of the switching circuit means and the first voltage divider terminal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE shows a battery charging arrangement in accordance with the present invention.

DESCRIPTION OF THE PREFERRED EMBODIMENTS

A preferred embodiment of the present invention will now be described with reference to the drawing.

The arrangement shown in the FIGURE, is plugged into the A.C. supply source at terminals 1 and 2. Connected across terminals 1 and 2 is the primary side of a transformer 3. Transformer 3 has a first secondary winding designated by reference numeral 5 and a second secondary winding designated by reference numeral 5a. Winding 5 is a center tap winding at whose extremeties are connected lines 6 and 7 which in turn are connected to the anodes of, respectively, thyristors 9 and 10. The cathodes of thyristors 9 and 10 are connected in common to a circuit point 8 which is the rectifier output terminal. Circuit point 8 is connected via line 11 to the positive side of the battery being charged, namely battery 12, whose negative terminal is connected via line 13 to the above-mentioned center point of winding 5. Thyristors 9 and 10 constitute rectifier means. During the charging process the rectifier means 9 and 10 are kept in a conductive state by a positive voltage applied at gates 14 and 15 respectively. These positive voltages are applied by means of a capacitor 18 through current limiting resistors 19 and 20 via lines 16 and 17 respectively. Capacitor 10 charges through a diode 23 connected in series with resistance 24, the anode of diode 23 being connected via line 21 to one terminal of the secondary winding 5a whose other terminal is connected to the center tap of winding 5. The voltage on capacitor 18 serves to keep both thyristors in the conductive condition during the charging time of battery 12. This is accomplished by charging capacitor 18 to a voltage which is higher than the positive battery voltage which exists at the cathode of the thyristor, namely at circuit point 8. Connected in parallel with capacitor 18 is the emitter-collector circuit of a transistor 44 whose function will be described later.

Connected to circuit point 8 is a voltage divider, first voltage divider means 25, comprising resistors 26, 29, 27 and 28 connected from the positive line to the negative line 22 which in turn terminates at the center tap of winding 5. Resistor 29 is a potentiometer having a wiper arm 30 which in turn is connected to the cathode of a Zener diode 40. The wiper arm 30 is further connected to negative line 22 via line 39 and capacitor 41. Connected in parallel with the first voltage divider means 25 are second voltage divider means comprising a capacitor 38 connected in series with a resistor 37 and a resistor 36. At the common point of resistors 36 and 37 is connected the base of a transistor 34 whose emitter-collector circuit is connected in parallel with resistor 28 of the first voltage divider means.

The anode of the above-mentioned Zener diode 40 is connected to the negative line 22 via a fixed resistor and is further connected to the base of a transistor 32 which forms the input stage of switching circuit means 31. In the particular embodiment shown in this Figure the switching means 31 are a Schmitt trigger. The output stage of the Schmitt trigger is a transistor 33. Switching stage 31 is designed to furnish a switching output signal which acts to interrupt the charging of battery 12 when the voltage at the base of transistor 32 is a voltage corresponding to the desired battery voltage at full charge.

The amplitude of the output voltage of the rectifier arrangement, this is the voltage between circuit point 8 and line 22 has an amplitude corresponding to the average of the D.C. battery voltage and the A.C. half wave voltage superimposed thereon. For A.C. voltages exceeding the nominal A.C. voltage, the portion contributed by the A.C. voltage to this average value is excessively high. In this case, the voltage value at the wiper arm 30 of the first voltage divider means 25 may be high enough to cause a switching of the switching means 31 even when the battery is not yet fully charged.

To prevent this, a variable impedance is connected in parallel with resistor 28 of the first voltage divider means (line 35). In the embodiment shown in the drawing, the variable impedance is the emitter-collector circuit of transistor 34. This impedance is controlled by the voltage applied to the base of transistor 34, namely the voltage at the common point of resistors 36 and 37 which are part of the second voltage divider means. It will be noted that capacitor 38 blocks the D.C. voltage from appearing at the second voltage divider terminal, namely the common point of resistors 36 and 37. The impedance of the emitter-collector circuit of transistor 34 is therefore controlled only by the A.C. component of the rectifier output voltage. Since the emitter-collector resistance of transistor 34 will decrease with increasing voltages at the base, the effective resistance of the portion of the first voltage divider means containing resistor 28 is decreased for increasing A.C. components of the rectifier output voltage, thereby causing the voltage at wiper arm 30 to decrease for increasing A.C. components. In this manner the voltage at the wiper arm 30, herein also referred to as the combined voltage, is affected both by the complete rectifier output voltage and also by the A.C. component thereof via the transistor 34. This combined voltage can therefore be made largely independent of the A.C. component as desired.

The above-described arrangement operates as follows:

When the battery charging arrangement is first plugged into the source of A.C. voltage, thyristors 9 and 10 are blocked. Thus no charge of current flows into the battery to be charged, namely battery 12. Capacitor 18 charges through diode 23 and resistance 24 to a voltage which may for example be 15 volts. The voltage across capacitor 18 is applied to the gates of thyristors 9 and 10 via the current limiting resistors 19 and 20. The voltage at the cathodes of the thyristors corresponds to a battery voltage of for example 7.5 volts and is therefore considerably lower than the voltage across capacitor 18. Thyristors 9 and 10 are thus in a conductive state and operate, during the charging process, as a standard diode, as long as capacitor 18 is charged.

The battery voltage rises as its charge is increased. When it is fully charged, it undergoes a more or less defined change in voltage. As soon as the battery output voltage and the voltage across capacitor 41, which is proportional thereto, have reached a predetermined value, Zener diode 40 becomes conductive, causing Schmitt trigger 21 to fire. The threshold voltage for the Schmitt trigger is adjustable via potentiometer 29. Input transistor 32 then changes from the blocked to the conductive state, while output transistor 33 changes from a conductive to a non-conductive state. The voltage at the collector of transistor 33 therefore rises. This increased collector voltage, which is substantially equal to the voltage at circuit point 8, is applied via a line 43 and a resistor 42 to the base of the transistor 44. The base of transistor 44 is connected to line 22 via resistor 45. The emitter-collector circuit of transistor 44 is connected in parallel with capacitor 18 (line 46). The increased voltage at the base of transistor 44 causes it to become strongly conductive, allowing capacitor 18 to discharge therethrough. The discharge of capacitor 18 in turn causes the voltage at the gates 14 and 15 of thyristors 9 and 10 to be decreased to a sufficiently low value to block said thyristors, thereby interrupting the charging of the battery.

For example, if it is assumed that the divider ratio of the first voltage divider means is 5:4, then, for a desired battery voltage of 7.5 volts, the output at the wiper arm 30 is approximately 3.3 volts. Thus Schmitt trigger 31 must have a threshold corresponding to a voltage of 3.3 volts. The A.C. components at the rectifier output voltage, which might cause too early a firing of trigger 31 are applied to the base of transistor 34 as described above, whereby the resistance of the emitter-collector circuit of transistor 34 varies as a function of said A.C. component. Since this resistance is in parallel with resistor 28, the rise in the combined voltage, namely the voltage at wiper arm 30, which would normally result from the increased A.C. component at the rectifier output, may be largely compensated for. The threshhold of the trigger circuit can thus be made substantially independent of the A.C. component, allowing the battery to be fully charged before automatic interruption of the charging process.

While the invention has been illustrated and described as embodied in particular circuits for effecting compensation for the A.C. rectifier output component, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Battery charging arrangement, comprising, in combination, rectifier means furnishing a rectifier output voltage having a DC and an AC component at a rectifier output terminal; means connecting said rectifier output terminal to said battery; first circuit means connected to said rectifier output terminal for furnishing a first voltage corresponding to said rectifier output voltage; second circuit means connected to said rectifier output terminal for furnishing a second voltage corresponding to said AC component of said rectifier output voltage; third circuit means connected to said first and second circuit means, for varying said first voltage as a function of said second voltage, said so-varying first voltage constituting a combined voltage; and terminating means connected to said first circuit means for terminating the charging of said battery when said combined voltage exceeds a predetermined voltage.

2. An arrangement as set forth in claim 1, wherein said first circuit means comprise first voltage divider means, furnishing said first voltage at a voltage divider terminal.

3. An arrangement as set forth in claim 2, wherein said second circuit means comprise second voltage divider means, and D.C. blocking means connected in series with said second voltage divider means.

4. An arrangement as set forth in claim 3, wherein said third circuit means comprise transistor means having an emitter-collector circuit connected in parallel with a determined portion of said first voltage divider means and a base connected to said second voltage divider means, in such a manner that a decrease in emitter-collector resistance resulting from an increase in said A.C. component of said rectifier output voltage results in a decrease of said voltage at said first voltage divider terminal.

5. An arrangement as set forth in claim 4, wherein said terminating means comprise switching circuit means furnishing a switching output signal when the voltage at said first voltage divider terminal exceeds a predetermined voltage.

6. An arrangement as set forth in claim 5, wherein said terminating means further comprise a Zener diode interconnecting said first voltage divider terminal and the input of said switching circuit means.

7. An arrangement as set forth in claim 6, wherein said rectifier means comprise at least one controlled rectifier element having a control electrode, said controlled rectifier element having a non-conductive state when the voltage at said control electrode is less than a predetermined control voltage.

8. An arrangement as set forth in claim 7, wherein said terminating means comprise additional transistor means having an emitter-collector circuit connected to said control electrode and a base connected to the output of said switching circuit means, for reducing said voltage at said control electrode to less than said predetermined control voltage in response to said switching circuit output signal.

9. An arrangement as set forth in claim 8, wherein said switching circuit means comprise a Schmitt trigger.

10. Battery charging arrangement, comprising, in combination, rectifier means furnishing a rectifier output voltage having a DC and an AC component at a rectifier output terminal; means connecting said rectifier output terminal to said battery; first voltage divider means connected to said rectifier output terminal and having a voltage divider tap; terminating means connected to said voltage divider tap for terminating the charging of said battery when the voltage at said voltage divider tap exceeds a predetermined voltage; and voltage dependent circuit means connected in parallel with a portion of said first voltage divider means, for decreasing the voltage at said voltage divider tap in response to increases of said AC component of said rectifier output voltage.

11. Battery charging arrangement, comprising, in combination, rectifier means furnishing a rectifier output voltage having a DC and an AC component at a rectifier output terminal; means connecting said rectifier output terminal to said battery; first voltage divider means connected to said rectifier output terminal, for furnishing a first voltage corresponding to said rectifier output voltage at a voltage divider terminal; second voltage divider means, including DC blocking means, connected to said rectifier output terminal for furnishing a second voltage corresponding to said AC component of said rectifier output voltage; transistor means having an emitter-collector circuit connected in parallel with a determined portion of said first voltage divider means and a base connected to said second voltage divider means, in such a manner that a decrease in emitter-collector resistance resulting from an increase in said AC component of said rectifier output voltage results in a decrease of said voltage at said first voltage divider terminal; and terminating means connected to said voltage divider terminal for terminating the charging of said battery when said voltage at said voltage divider terminal exceeds a predetermined voltage.

* * * * *